Feb. 11, 1936.    R. STRINDBERG    2,030,552

DRY TYPE SELF CLEANING AIR FILTER

Filed July 12, 1932    6 Sheets-Sheet 1

INVENTOR
Richard Strindberg
BY
ATTORNEY

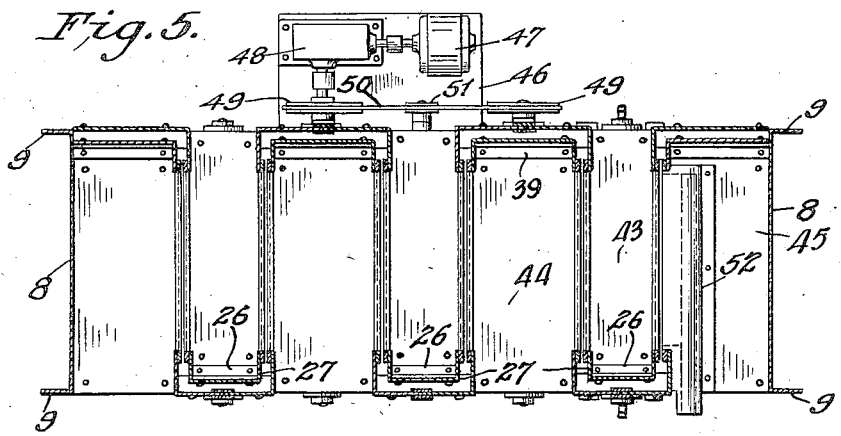
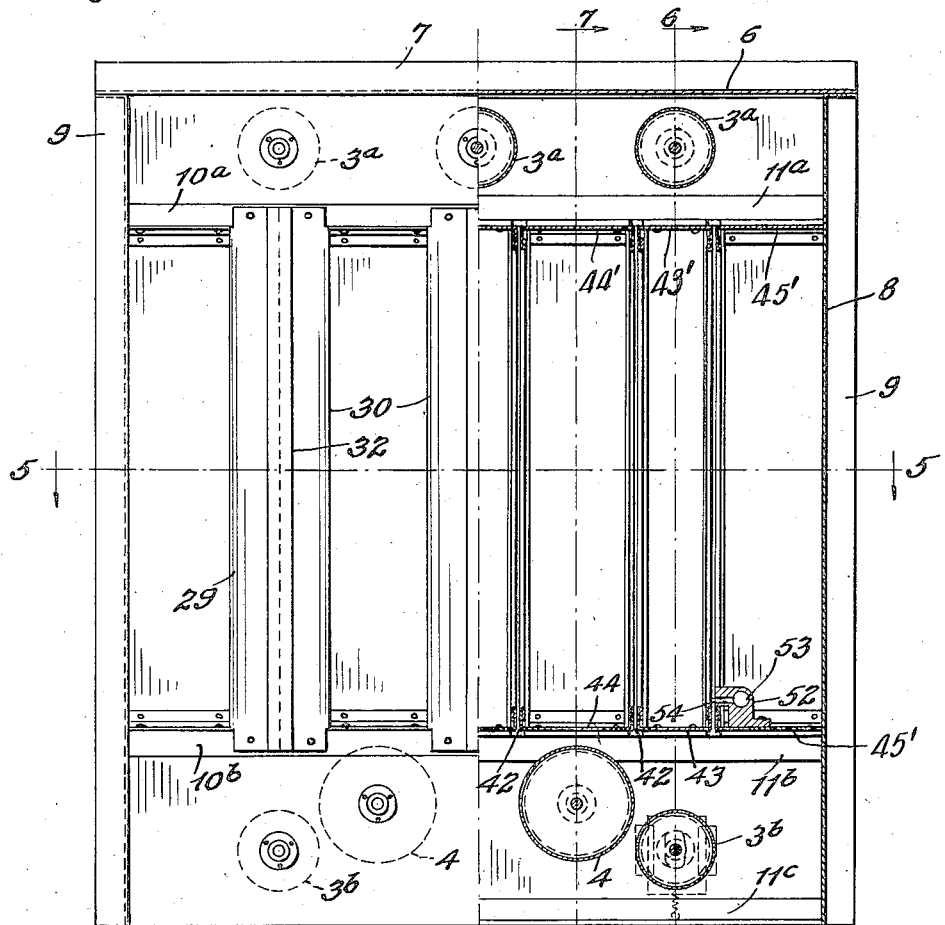

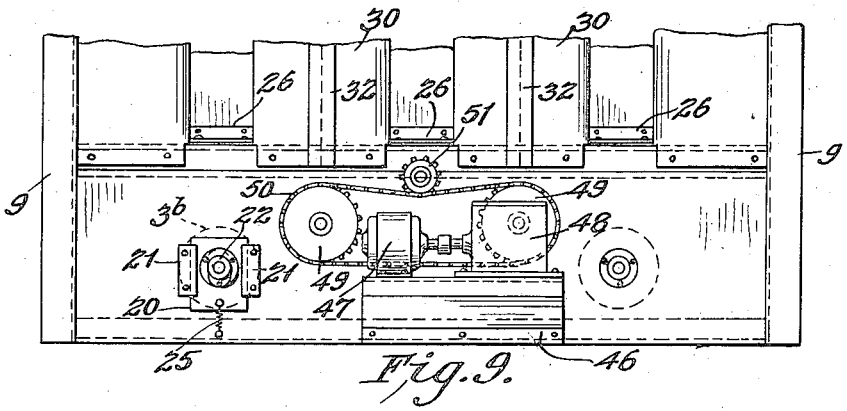
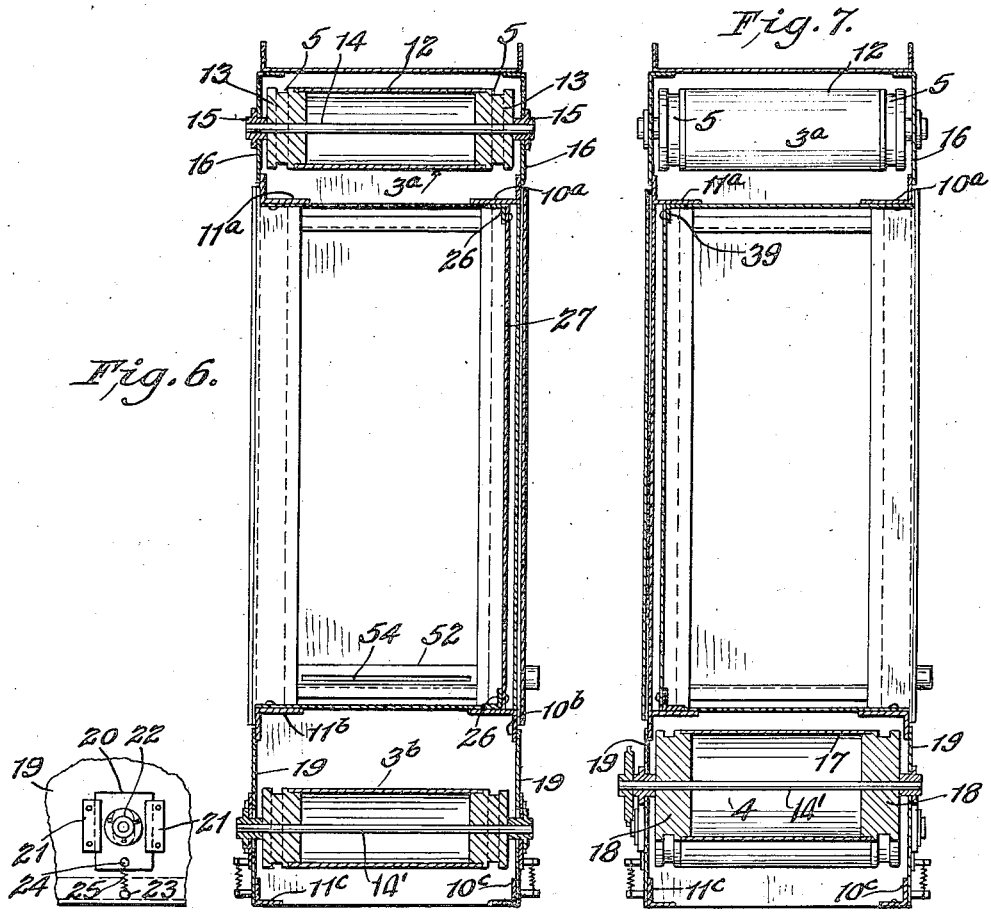

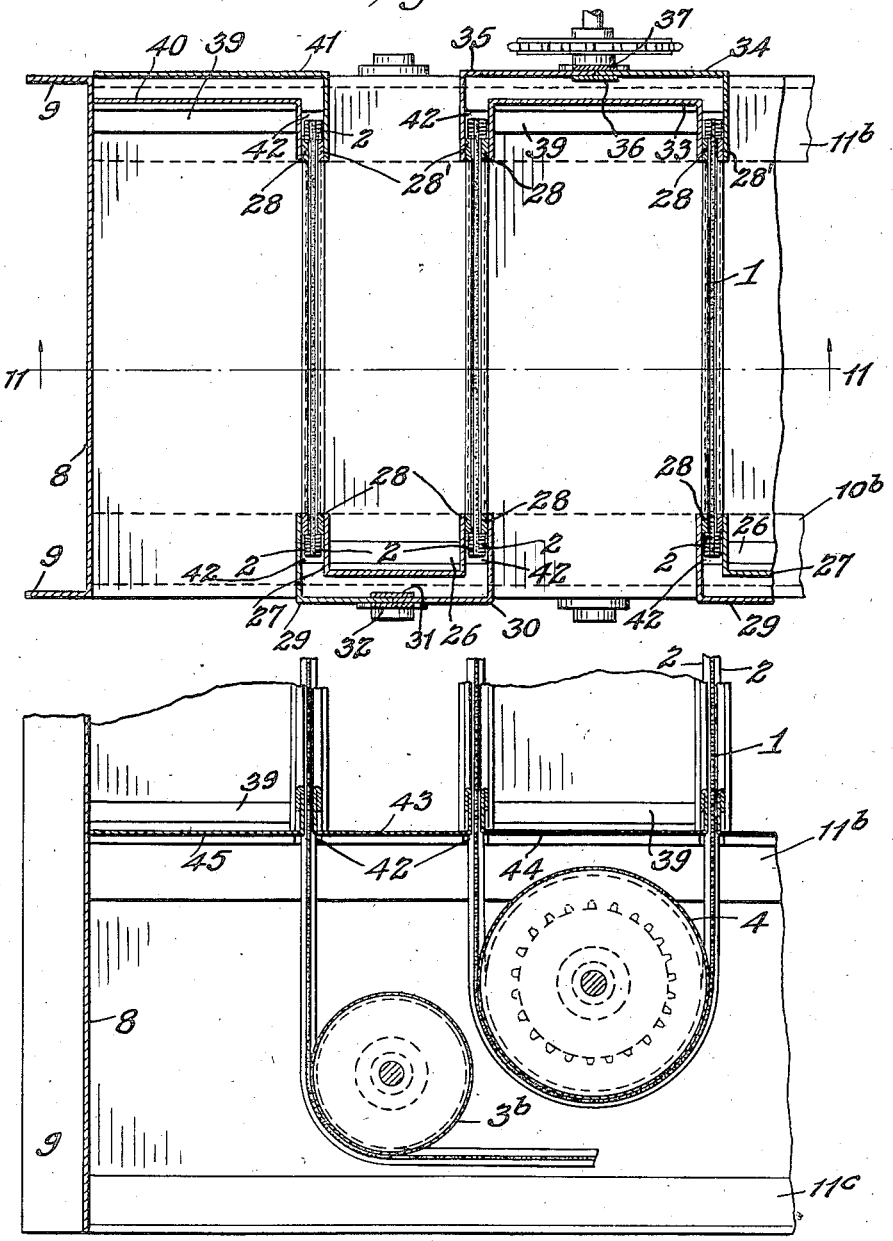

Feb. 11, 1936.            R. STRINDBERG            2,030,552
              DRY TYPE SELF CLEANING AIR FILTER
                    Filed July 12, 1932        6 Sheets-Sheet 5

INVENTOR-
Richard Strindberg
BY
C. P. Goepel
ATTORNEY-

Patented Feb. 11, 1936

2,030,552

UNITED STATES PATENT OFFICE 2,030,552

DRY TYPE SELF-CLEANING AIR FILTER

Richard Strindberg, Worcester, Mass., assignor to Development Associates, Inc., Worcester, Mass., a corporation of Massachusetts Application July 12, 1932, Serial No. 622,038

11 Claims. (Cl. 183—63)

The present invention relates to air filters of the dry type which are designed to remove dust, dirt and other foreign substances suspended in the air during the passage of the air through a filter curtain, the interstices of which are small enough to prevent the passage of the suspended substances, without however, impeding to any great extent the movement of the air therethrough.

One object of this invention is to provide means for automatically, and at certain intervals, removing all substances which have collected on the filter medium, thereby eliminating the necessity for manual cleaning. As the filter used in this particular design is of the dry type, using for example a filter curtain which consists of pure wool felt, the substances extracted from the air and collected on the filter medium will be removed in the same manner as they enter the filter and such cleaning can take place without interfering with the operation of the filter.

Another object of the invention is to arrange the filter medium in such a way that the incoming dust laden air will pass through only one layer of the curtain as otherwise the resistance against the air flow would increase materially and thereby also decrease the capacity of the whole filter unit.

The invention also involves the provision of efficient air seals along the edges of the filter curtain so that no dust laden air may by-pass to the clean air side.

Other objects and advantages of this invention will be clear from the following description taken in connection with the drawings by which a preferred embodiment of the invention is disclosed. But, I, of course may resort to changes not illustrated herein; especially in matters of shape, size and arrangement of the parts to the full extent indicated by the broad and general meanings of the terms in which the appended claims are expressed.

In the drawings—

Figure 4 is a front elevation of the assembled filter, partly in section with filter medium removed;

Figure 5 is a section on line 5—5 of Figure 4, showing the frame construction of the filter with filter medium removed;

Figure 6 is a section on line 6—6 of Figure 4;

Figure 7 is a section on line 7—7 of Figure 4;

Figure 8 is a side view of a detail included in Figure 6;

Figure 9 is a rear view of Figure 5 showing a driving connection;

Figure 10 is an enlargement of part of Figure 5 showing filter medium in place and arrangement of air seals;

Figure 11 is a section of Figure 10 on line 11;

The same numerals identify the same parts throughout.

Figures 2, 3:
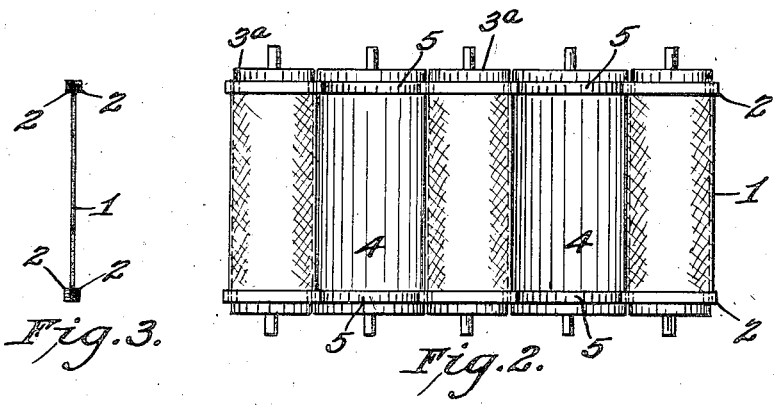
Figure 2 is a plan view of Figure 1.
Figure 3 is a section on line 3—3 of Figure 1.
Figure 1:
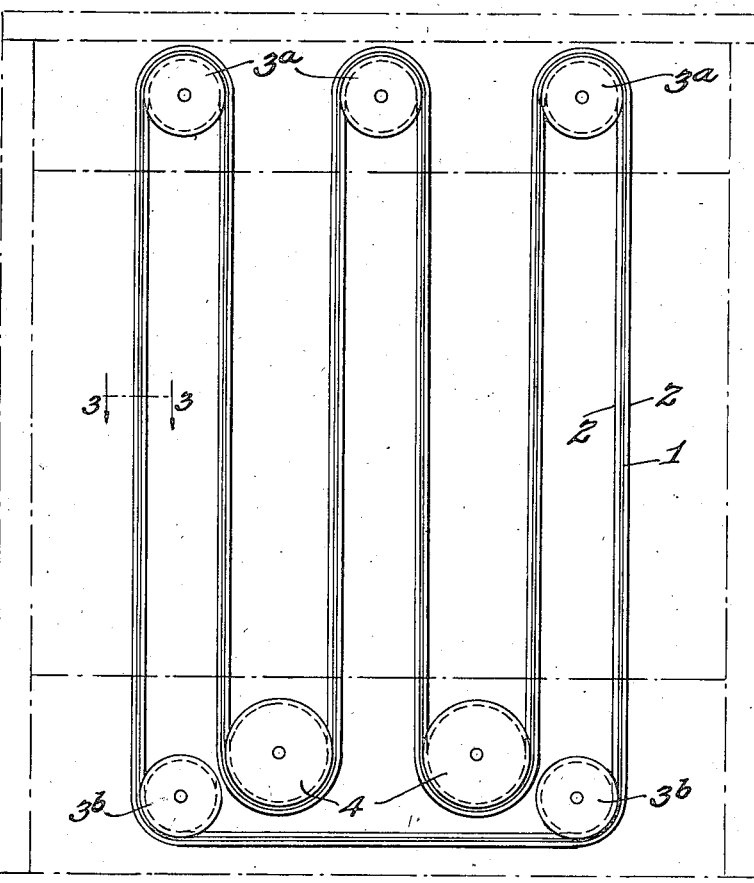
Figure 1 is a front elevation showing the general arrangement and mounting of the filter medium in the filter frame.

In the description of the drawings and particularly with reference to Figures 1, 2 and 3, the filter medium 1 consists of an endless curtain, preferably wool felt, provided with belts 2 which are attached to each side of the curtain along both edges thereof, the belts being preferably of cotton fabric or leather. The curtain is mounted on rollers 3a, 3b and 4, which all have grooves 5 adjacent the ends thereof in which the belts travel. As the belts are attached to both sides of the curtain, it will be properly guided at all times regardless of the direction of travel, particularly when the entire curtain is supported by the part of the rollers between the grooves. The rollers 3a and 3b are merely idlers which support and guide the curtain whereas the rollers 4 are used for driving the curtain at slow speed whenever the cleaning operation takes place. The dot-dash lines in Figure 1 represent a frame work in which the curtain and the rollers are mounted, the framework being shown in full in Fig. 4. As both the top rollers 3a and the bottom rollers 3b and 4 are hidden inside of separate closed compartments, only the parallel vertical portions of the curtain are in a position to intercept the air flow and thereby to provide for cleaning of the air. One of the rollers 3b, Figs. 8 and 9, is mounted under spring tension so as to give the curtain proper tension at all times as the total length of the curtain may vary from time to time due to atmospheric changes or stretching.

In Figure 4, which shows a front elevation of the assembled filter frame, partly in section, the top plate 6 is made of one piece of sheet steel having a channel shaped cross section. The two side plates 8 have the same width and cross section as the top plate 6 so that when all three are bolted or otherwise secured together, the flanges on the top plate 6 and the flanges 9 on the side plates 8, are flush with each other thereby forming a continuous flange on all three sides of the filter, both in the front and in the rear, by means of which the entire filter unit is easily connected either to a duct or wall opening as conditions may require. As best shown in Figures 6 and 7, angle irons, 10a, 10b and 10c at the front, as well as angle irons 11a, 11b, and 11c at the rear of the filter frame serve as horizontal braces between the two side plates 8, and also support the various parts which form the guide chutes for the edges of the filter curtain, as well as the parts forming the upper and lower compartments.

The rollers 3a, which are mounted in the upper part of the filter frame, are all identical in shape and size. These rollers are made up of thin sheet metal tubes 12 having inserted at each end a cast iron cover 13, provided with a groove 5 in which the belts on the filter curtain are received, as has previously been described. Supporting shafts 14 for the rollers project through center holes in the end covers 13 and the ends of the shaft are journalled in bearings 15 which are attached to cover plates 16, Figs. 6 and 7, at the front and rear of the filter frame adjacent the top thereof. The cover plates 16, together with the top plate 6 and horizontal plates 43' and 44' which extend between the angle irons 10a and 11a, and are hereinafter more fully described, define a compartment in which the rollers 3a are located.

The two smaller rollers 3b adjacent the bottom of the filter frame are in shape and size identical to the rollers 3a in the upper compartment. The larger rollers 4 also adjacent the lower part of the frame are made up in a similar manner but the sheet metal tube 17 as well as the end covers 18 are of larger diameter. By having the rollers 4 larger than the rollers 3a in the upper compartment, the intake openings for the air, which are located directly above these rollers, are larger than the outlet openings which are located directly beneath the smaller rollers. The rollers 3b and 4 in the lower compartment have supporting shafts 14' which are journalled in bearings 15 attached to cover plates 19, all of the bearings being fixed relative to the plates with the exception of the bearings for one of the rollers 3b. The bearings for this roller are carried on separate steel plates 20, guided by chutes 21 secured to the plates 19. The cover plates 19 have vertically arranged slots 22 which permit the shaft for roller 3b to move freely up and down to a limited extent. The plates 19 and 20 are furnished with steel pins 23 and 24 respectively, which are located on the vertical centerline of the bearings, and a coil spring 25 which is suspended between said pins exerts a downward pull on the plates 20 and thereby gives the proper tension to the filter curtain when it is mounted on the rollers as illustrated in Fig. 1.

On the air intake side of the filter frame, the wide flanges of the angle irons 10a and 10b carry short angle clips 26 which are fastened to the lower and upper sides of said angle irons respectively, as illustrated in Figure 6 and Figure 7. Channel shaped sheet metal members 27, Fig. 10, extend the full length between angles 10a and 10b and are fastened to the angle clips 26 at top and bottom. To the outside of the flanges of channel 27 and along the edges thereof are secured, as by spot welding, flat steel strips 28 of the same length as the channels (Fig. 10). In Figure 10, which in part is an enlargement of Figure 5, are shown two angle shaped sheet metal members 29 and 30 which form a channel when put together. In shape and size they are identical but to the member 30 are secured, as by spot welding, inner and outer sheet metal strips 31 and 32 respectively, which form a chute into which one end of the member 29 fits snugly, a perfect air seal between said members being thereby obtained. It is necessary or desirable to make up this channel from two separate parts in order to permit the belts 2 which are secured to the edges of the filter curtain 1 to be positioned between the adjoining flanges of the inner and outer channel members, as shown. At top and bottom, the members 29 and 30 are attached to the front flanges of angle irons 10a and 10b, as shown on the left side of Figure 4. To the inside of the members 29 and 30 and in alinement with the strips 28 above referred to are also secured, as by spot welding, flat steel strips 28'. At the discharge side of the filter and above the large rollers 4 are mounted an inner channel member 33, and an outer channel member, consisting of two angle shaped parts 34 and 35, and inner and outer sheet metal strips 36 and 37 secured, as by spot welding, to the part 34. Flat steel strips 28 and 28' are secured, as by spot welding, to the opposed flanges of the members 33, 34 and 35 respectively. In length and shape all these parts resemble exactly similar parts used at the intake side of the filter and are also supported in the same manner. Angle clips 39 which are attached to the angles 11a and 11b support the inner channel members 33 and the outer parts 34 and 35 are secured to the vertical flanges of said angles 11a and 11b. The right and left hand corners of the filter frame at the discharge side thereof between the outermost vertically positioned portions of the curtain and the side walls 8, are closed by one inner angle bar 40 and an outer angle bar 41, the former being supported at its upper and lower ends by angle irons 39 and the bar 41 being secured directly at upper and lower ends to the vertical flanges of the members 11a and 11b. Strips 28' and 28 are secured in opposed relation to each other to the inner and outer sides of the bars 41 and 40, respectively, the purpose of which is to provide air seals for the outermost vertical portions of the felt curtain.

With reference to Figure 10, it is obvious that after the filter curtain 1 with attached belts 2 is mounted on the rollers as indicated in Figure 1, the curtain will move freely in the slots formed between opposed flat steel strips 28 which are spaced apart a distance slightly greater than the thickness of the curtain. The inner edges of the belts 2 are rising against the flat steel strips 28 and thereby prevent the edges of the curtain from being pulled out from between said strips and, at the same time, forming perfect air seals which extend the full distance between the upper and lower compartments. In all places where the filter curtain enters the upper or lower compartment, the horizontal flanges of the angle irons 10a, 10b, 11a and 11b are provided with slots 42, for free passage of the edges of the curtain. In order to prevent any air from by-passing, sheet metal plates 43, 44 and 45 extend horizontally between adjacent vertical portions of the filter curtain between the angle irons 10b and 11b, and similar plates 43', 44' and 45' extend between the angle irons 10a and 11a, thereby defining the upper and lower walls of the filtering chamber. These plates have flanges at opposite edges which extend in parallel relation to the curtain and spaced slightly therefrom with the outer edges of said flanges turned over so as to provide smooth edges which will not wear the felt curtain when it travels over the rollers. The spacing between the flanges of adjacent plates is the same as the spacing between the strips 28 above referred to. As above stated, the plates 43, 44 and 45 are attached to the horizontal flanges of angles 10b and 11b at the lower part of the filter and form the top wall of the lower compartment. Similar plates are attached to the horizontal flanges of angles 10a and 11a at the upper part of the filter and form the bottom wall of the upper compartment.

When the filter is in operation, in other words, when air is drawn through the pocket shaped openings in front of the filter, it is obvious that the air will pass through the parallel vertical portions of the filter curtain which are exposed between the upper and the lower compartments and will leave the filter through the openings which are located below the upper rollers 3a and on their vertical center lines. As the parts of the filter curtain which are hidden inside of the upper and lower compartments are relatively short in comparison to the exposed portions of said curtain between the compartments, the greatest possible area of the curtain is utilized as a filter medium. A decided advantage resides in the fact that the same side of the curtain will at all times be exposed to the incoming air; in other words, all dust, dirt and other substances will be collected on one side only of the felt curtain. In most designs of self cleaning air filters, both of the dry type as well as the impingement type, in which a travelling curtain is used, the curtain is usually arranged in such a way that the part of it which is facing the incoming dust laden air will later on move over to the clean air side and if not properly cleaned before reaching such a position, the dust will be entrained by the clean air as it passes a second time through the curtain.

At the discharge side and at the lower part of the filter frame is a bracket 46 supporting an electric motor 47 which is connected to the shaft of one of the larger rollers 4 through suitable speed reducing means 48. The shaft extensions of the large rollers 4 carry sprockets 49 of equal size which are all driven simultaneously by means of a chain 50. An idler sprocket 51 is adjustably mounted on the plate 19 to give the chain 50 the proper tension. The arrangement is illustrated in Figure 5 and Figure 9. The number of driving rollers 4, as well as the supporting rollers 3a may be varied, depending upon the width of the filter unit, to obtain the proper number and spacing of the vertical portions of the filter curtain. The large diameter rollers 4 insure a steady travel of the curtain, without any slipping. The plates 43, 44 and 45 forming the upper wall of the lower compartment and the plates 43', 44' and 45' defining the lower wall of the upper compartment form therebetween a filter chamber which is divided into a plurality of compartments by the vertically extending portions of the filter curtain. Alternate compartments are open at the intake side of the filter frame and the remaining compartments are open at the discharge side of the frame. Air or other gas to be filtered enters the alternate compartments and passes through the filter curtain into the other compartments, from which it is discharged at the discharge side of the filter.

In the intake opening shown at the extreme right hand side of the filter in Figure 4 and Figure 5 is placed a nozzle 52, having a cylindrical passage 53, and a narrow slot 54 in communication with the passage 53. The length of the slot is approximately equal to the width of the filter curtain and the front of the nozzle is placed close to the curtain. The outlet opening of the nozzle is connected to an ordinary vacuum cleaner of suitable construction, so that all dust which has accumulated on the curtain will easily be removed therefrom when the curtain is advanced past the nozzle. The curtain normally travels downwardly past the nozzle so that all dirt will be removed before the curtain enters the lower compartment where it is not subject to the air flow and will consequently leave the lower compartment in a clean condition as it enters the filter chamber.

In air filters built on the impingement principle, it is essential that the dust particles have a certain velocity in order to be caught by the oil film which covers the filter medium. In the dry type of air filters, conditions are different and the cleaning efficiency of a filter medium, for instance, wool felt, remains the same regardless of the velocity of the dust particles carried by the air passing through said medium. As a matter of fact, a low velocity for the dust particles is advantageous in a dry filter as the particles otherwise would have a tendency to become imbedded in the filter medium. However, the design of an efficient dry type air filter involves several problems, for instance, not only the selection of a filter medium of high cleaning efficiency, but also the arrangement of the filter medium in such a way that the largest possible area of the filter medium is used within the space available without undue restriction of the movement of the air therethrough. If the filter medium is arranged in pocket shape, it is therefore important that inlet and outlet openings between the pockets be properly dimensioned. The most satisfactory arrangement for a filter curtain is in the form of pockets with the walls forming the pocket converging in the direction of movement of the air into said pockets for filtering. In order to provide an efficient filter, it is therefore of importance to consider not only the efficiency of the filter medium but also the efficiency of the whole filter unit. For instance, a large area of filter medium with a great number of pockets may give considerably lower capacity than less filter area and a smaller number of pockets, depending upon the spacing and size of the pockets.

Figure 12:
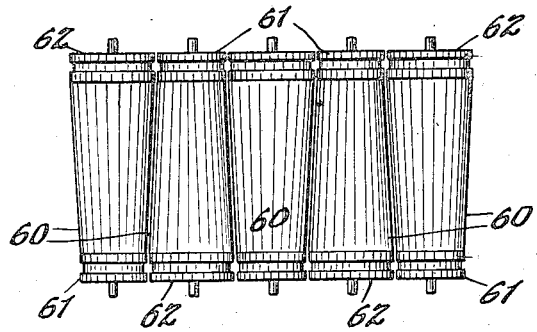
Figure 12 is a plan view showing an alternative form of the supporting and guiding rollers for the filter curtain.

The advantages of the tapered pockets, above described, can be obtained in the present filter by using tapered rollers, all of which are of the same size, but arranged somewhat differently than when straight rollers are used. With reference to Figure 12 which shows a plan of the rollers, it is obvious that the tapered pocket shape will be obtained, but due to the fact that the rollers are tapered, the total length of the curtain would be shorter on the air intake side, where the belt runs over a greater number of the small ends of the rollers unless certain means were used to equalize the length of the belt.

Figure 13:
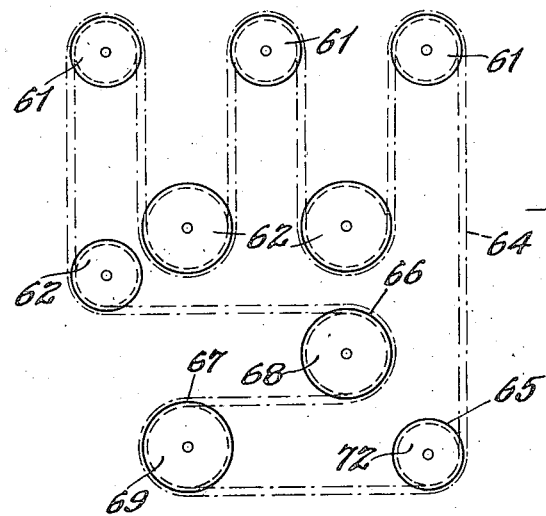
Figures 13 and 14 are diagrammatic views taken in the same direction through the opposite ends of the supporting rollers.
Figure 14:
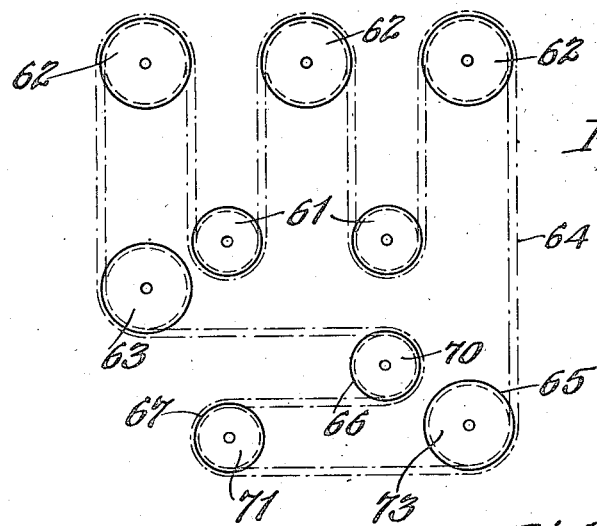
Figure 15:
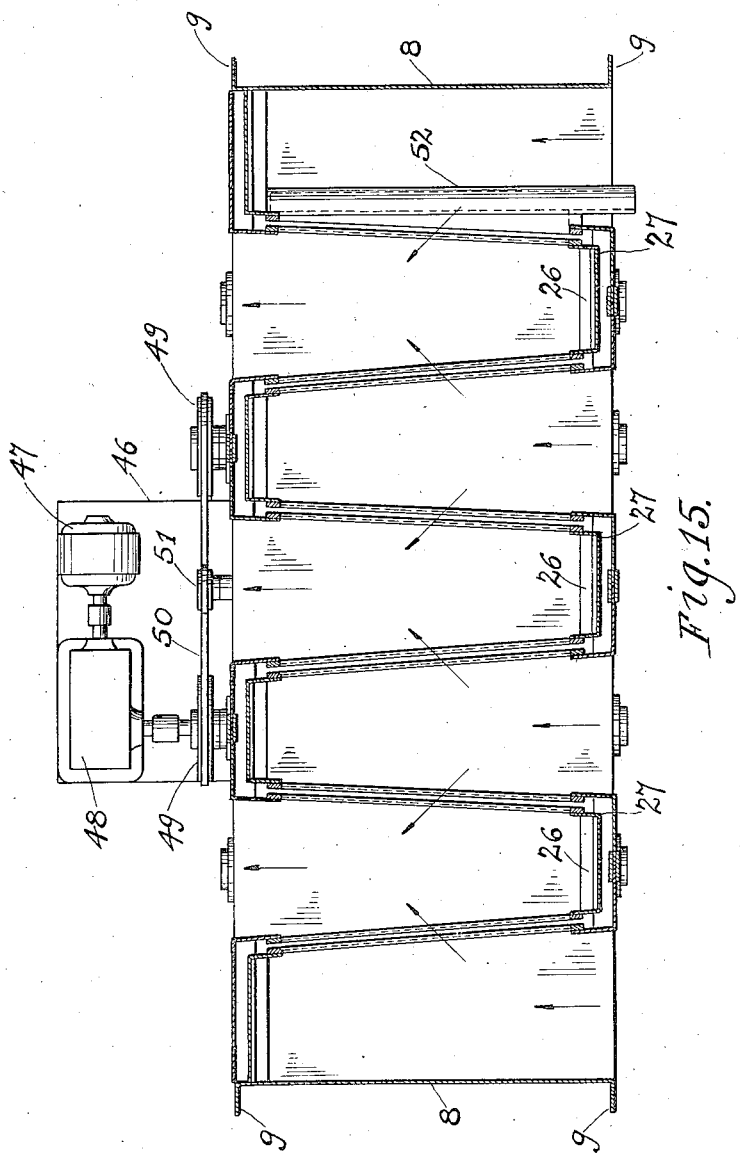
Fig. 15 is a sectional view through a filter unit when the tapering rollers of Fig. 12 are in use.

In Figure 12 are shown conically shaped rollers 60, having small diameter ends 61, and larger diameter ends 62. The intake side has the smaller ends 61 of the rollers 60 in the upper row of rollers, as shown in Fig. 13. The lower row of rollers 60 have their larger ends 62 at the intake side. The upper rollers have their larger diameter toward the outlet side, and the lower row of rollers have their smaller ends at the outlet side, as shown in Figure 14.

A roller 63 is positioned in the lower compartment directly beneath one end roller of the upper row and somewhat beneath the lower row of rollers just referred to. This roller 63 is placed in a similar position to the roller 60 immediately above, that is, the small end of the roller is at the intake side, as shown in Fig. 13, and the large end is at the outlet side, as shown in Figure 14.

Insofar as the contact surface of the endless curtain shown in dotted lines in these figures and indicated by 64, with the rollers 60 and 63, just described, is concerned, the conical shape of the rollers and the positions thereof are such that the necessary length of the curtain at the discharge side thereof is substantially greater than the necessary length at the intake side of the filter unit. In order that opposite edges of the filter curtain may be of the same length, additional conical or tapered rollers are provided which are disposed in such a manner as to compensate for the effect of the tapering rollers so that the curtain may be of the same length at opposite edges. For instance, in Fig. 14, an additional guide roller 65, having its small end at the intake side, and two guide rollers 66 and 67, having their larger ends at the intake side, compensate for the taper of the other rollers, and allow the length of curtain at opposite edges thereof to be the same. By the arrangement of these rollers in this manner, a curtain having opposite edges of equal length can be used and any tendency of the curtain to creep laterally when the curtain is advanced around the rolls is eliminated.

It will be noted that rollers 62 and 63, as also 62 and 65, are arranged vertically in line with each other, so that the curtain at its edges is parallel though inclined.

Either roller 66 or 67, may be adjustable in position to compensate any looseness in the curtain.

It will therefore be noted that due to the inclination of the curtain to the intake flow, which inclination results from the arrangement of tapered rollers as described, a very efficient filtering action takes place without involving any substantial pressure differential between the opposite sides of the curtain and without materially interfering with the flow of air through the filter.

It will be noted from the above that the important features of my present invention are substantially as follows:

Only one side of the continuous filter curtain is exposed to the incoming dust laden air, and this dust collecting side of the curtain is never reversed and presented to the clean air side during the travel of said curtain, so that there is no possibility of the collected dust being blown off into the outlet air passages of the filter.

The continuous filter curtain is so mounted and supported in the filter frame, that only the parallel vertically moving portions thereof between the supporting rollers function as the air filtering medium, the remaining parts of the filter curtain above and below such portions which move over the supporting rollers being disposed in compartments or chambers which are substantially sealed against communication with the air inlet and outlet passages of the filter, so that the air is thus forced to pass at an angle through the exposed portions of the filter curtain from each of the inlet passages to an outlet passage of the filter, said inlet and outlet passages extending in substantially parallel relation to the general direction of air flow through the filter.

The area of the air inlet passages will always be in the same proportion to the outlet passages regardless of the width or height of the filter installation, and owing to the very large inlet and outlet area which is provided, velocity of the air in its passage through the curtain is reduced to a minimum.

Effective means are provided at each side edge of the continuous filter curtain for sealing direct communication between the inlet and outlet sides of the filter, and also to provide for the proper guiding tension and travel of the filter curtain as it passes over the supporting rollers, regardless of the direction of travel.

The cleaning nozzle is located closely adjacent to the point of entrance of the dust laden curtain at one end thereof to one of the roller compartments, so that no part of the filter curtain can enter said compartment without first being thoroughly cleaned during each complete circuit of travel of the curtain.

The tapering upper and lower guiding and supporting rollers for the filter curtain provide inlet and outlet openings at opposite sides of the filter of exactly the same dimension, and also result in the passage of the air at a sharper angle through the filter curtain between the inlet and outlet passages, thus tending to avoid the creation of eddy air currents within the inlet passages and enabling a relatively large volume of air to be rapidly filtered.

I claim:

1. In an air filter, a frame having spaced compartments and a filtering chamber therebetween, an endless filter curtain of continuous sheet material, rollers mounted in each of said compartments and supporting and guiding the filter curtain for movement in a circuitous path, spaced stretches of said curtain extending through the filtering chamber between said compartments and forming the opposite walls of alternating substantially parallel air inlet and outlet passages opening on opposite sides of the frame, cooperating sealing means on said frame at the opposite sides of the filter chamber and at the edges of the filter curtain, preventing direct communication between the inlet and outlet passages, said means on the curtain also cooperating with said rollers to guide and tension the curtain, means substantially sealing communication between said passages and the roller compartments, and means for moving said filter curtain.

2. In an air filter, a frame having spaced compartments and a filtering chamber therebetween, an endless filter curtain of continuous sheet material, reversely tapering rollers mounted in the respective compartments for supporting and guiding said curtain for movement in a circuitous path through the filtering chamber with adjacent stretches thereof transversely converging and forming the opposite walls of alternating air inlet and outlet passages having open ends of the same dimensions at relatively opposite sides of the filtering chamber, and means for moving said filter curtain.

3. In an air filter, a frame including spaced vertical walls at the opposite sides thereof having alternately arranged openings and forming intermediate closed ends of air inlet and outlet passages, an endless filter curtain of continuous sheet material mounted in said frame between said vertical walls and the openings therein to form filter walls each of a single thickness of said material common to the adjacent air inlet and outlet passages, and means for moving said filter curtain, the air entering the open ends of said air inlet passages in a direction substantially at right angles to the direction of movement of the stretches of the filter curtain and parallel to the plane of said curtain and passing through said filter curtain at reduced velocity into the outlet passages of the filter.

4. In an air filter, a frame having substantially air tight compartments at its upper and lower ends and a filter chamber therebetween, an endless filter curtain of continuous sheet material, rollers mounted in each of said compartments supporting and guiding the filter curtain for movement in a circuitous path through the filter chamber, spaced stretches of said curtain extending between said compartments in the filter chamber to form the opposite walls of alternating air inlet and outlet passages opening at the opposite sides of the filter chamber, the air entering said inlet passages in a direction substantially at right angles to the direction of movement of the stretches of said filter curtain and parallel to the plane of said curtain and passing through the latter at reduced velocity into said outlet passages, means substantially sealing communication between said passages and the roller compartments, and means for moving said filter curtain.

5. In an air filter, a frame, an endless filter curtain of continuous sheet material, vertically spaced supporting rollers for said filter curtain, said frame including a substantially air tight compartment in which one of said rollers is mounted, spaced stretches of said curtain forming therebetween an air chamber opening upon one side of the frame, said frame having a wall at its opposite side closing said passage, the air entering said inlet passage in a direction substantially at right angles to the direction of movement of the stretches of said curtain and parallel to the plane of said curtain, whereby the air passes through the filter curtain at reduced velocity, means for moving said filter curtain, and a vacuum nozzle mounted in the frame closely adjacent to the entrance of one stretch of the filter curtain into said compartment to remove dust accumulations therefrom.

6. In an air filter, a frame having spaced compartments at its upper and lower ends and a filter chamber therebetween, rollers mounted in each of said compartments, an endless filter curtain of continuous sheet material mounted on said rollers in said frame for movement in a circuitous path and having spaced stretches in said filter chamber forming the opposite walls of alternating substantially parallel air inlet and outlet passages opening at the opposite sides of the filter chamber, means for moving said filter curtain, a vacuum nozzle mounted in the frame closely adjacent to the entrance of one stretch of the filter curtain into a compartment to remove dust accumulations therefrom, means substantially sealing communications between said passages and the roller compartments, said sealing means comprising spaced angled members forming a channel and means for holding said angled members in assembled position.

7. An air filter of the character described, comprising a frame having spaced compartments and a filtering chamber therebetween, an endless filter curtain of continuous sheet material, rollers mounted in each of said compartments for supporting and guiding the filter curtain for movement in a circuitous path, spaced stretches of said curtain extending between said compartments and through the filtering chamber and forming the opposite walls of alternating substantially parallel air inlet and outlet passages opening at the opposite sides of the filtering chamber, strain members secured to opposite sides of the curtain at each of its edges, and removable sealing means comprising each an inner and an outer channel shaped member to cooperate with the opposite edge portions of the curtain adjacent to said strain members to form air-tight joints at the edges of said curtain.

8. An air filter, comprising a frame open at opposite sides, an endless filter curtain, rollers mounted in the frame in spaced groups to provide a filtering chamber therebetween and supporting the filter curtain with its web disposed in spaced runs extending in planes transverse to the frame and presenting the opposite edges of the web at the opposite open sides of the filter chamber, said runs of the web providing transverse compartments opening at the opposite sides of the filter-chamber, web sealing and compartment end closing members removably mounted at the opposite open sides of the frame and alternately disposed at the ends of the consecutively arranged transverse compartments for closing one end of each compartment and with the compartments alternately and consecutively opening through the opposite sides of the frame, said members engaging the adjacent edge portions of the web runs to seal the ends of the compartments therebetween and guide the runs of the web, and means for moving said endless filter curtain.

9. In an air filter, an open sided frame having spaced compartments and an intermediate filter chamber therein and series of rollers in the compartments, an endless filter curtain mounted on said rollers and stretched back and forth between said compartments through the filter chamber and with a return run entering one end of one compartment and leaving the other end of said compartment, cleaning means for the filter curtain engaging across the return run at the point of entrance thereof into said compartment, the stretched portions of the curtain providing spaced filter walls, and combined guides and closure members disposed staggered at the opposite sides of the frame, each member engaging across the space between an adjacent pair of filter walls and engaging the same to support the filter walls for movement as parts of the curtain and for closing the intervening space between the walls, said members being staggered in the frame to close the opposite alternate ends of the spaces and leave inlet spaces at one side of the frame and outlet spaces at the other side of the frame with separating walls of the webs of the filter curtain.

10. In an air filter, a frame having spaced compartments and a filter chamber therebetween and open at its opposite sides, an endless filter curtain mounted in the frame and having a series of spaced runs extending through the filter chamber between the compartments, with the opposite edges of said curtain adjacent the opposite open sides of the frame, said spaced runs providing a series of pockets opening at the opposite sides of the frame, and combined pocket closing and web supporting members mounted in alternate staggered relation at the opposite sides of the frame against the opposite ends of their respective pockets to close the successive pockets alternately at opposite sides of the frame, each of said members comprising a pair of interfitting spaced channel shape elements disposed with their edge portions at the opposite sides of the edge portions of adjacent runs of the filter curtain and extending between the adjacent runs to close the adjacent end of the interposed pocket, and means for moving the endless curtain.

11. In an air filter, a frame having spaced compartments and an intermediate filter chamber with open opposite sides for passage of air transversely through the chamber, an endless filter curtain, a plurality of rollers in said compartments supporting the filter curtain in stretched position with a plurality of spaced runs extending between the compartments through the filter chamber and edgewise to the open sides of the frame to divide the frame into a plurality of pockets, and web guiding and pocket sealing members disposed in staggered relation at opposite sides of the frame between alternate pairs of said runs and slidably engaging the latter to support the webs and to close the alternate opposite ends of the pockets whereby alternate pockets open through one side of the frame to receive air for passage through the webs of the filter curtain and intermediate pockets open through the opposite side of the frame for the outlet of air after passage through said webs.

RICHARD STRINDBERG.